US012096846B2

(12) United States Patent
Desyr

(10) Patent No.: US 12,096,846 B2
(45) Date of Patent: Sep. 24, 2024

(54) MULTIFUNCTIONAL HANDHELD APPLICATOR

(71) Applicant: Garry Desyr, Merrick, NY (US)

(72) Inventor: Garry Desyr, Merrick, NY (US)

( * ) Notice: Subject to any disclaimer, the term of this patent is extended or adjusted under 35 U.S.C. 154(b) by 351 days.

(21) Appl. No.: 17/668,497

(22) Filed: Feb. 10, 2022

(65) Prior Publication Data

US 2022/0265036 A1 Aug. 25, 2022

Related U.S. Application Data

(60) Provisional application No. 63/148,271, filed on Feb. 11, 2021.

(51) Int. Cl.
*A46B 13/02* (2006.01)
*A46B 11/00* (2006.01)
(Continued)

(52) U.S. Cl.
CPC ............ *A46B 13/02* (2013.01); *A46B 11/002* (2013.01); *A46B 13/04* (2013.01); *A47K 7/022* (2013.01);
(Continued)

(58) Field of Classification Search
CPC .............. A46B 11/002; A46B 11/0062; A46B 11/0065; A46B 13/02; A46B 13/026; A46B 13/04; A46B 2200/1006; A46B 2200/1046; A47K 7/02; A47K 7/022; A47K 7/03; A47K 7/04; A45D 34/04; A45D 34/042; A61C 17/3427; A61C 17/3472; A61C 17/3481; A61H 7/003; A61H 7/004; A61M 35/006
See application file for complete search history.

(56) References Cited

U.S. PATENT DOCUMENTS

| | | | |
|---|---|---|---|
| 4,483,356 A | 11/1984 | Kales | |
| 5,566,418 A | 10/1996 | Steffen et al. | |

(Continued)

FOREIGN PATENT DOCUMENTS

| | | | |
|---|---|---|---|
| CN | 105326430 A | * | 2/2016 |

OTHER PUBLICATIONS

CN 105326430 A; Publ'n date: Feb. 17, 2016; Inventor: Guo et al.*

*Primary Examiner* — Randall E Chin
(74) *Attorney, Agent, or Firm* — Boudwin Intellectual Property Law, LLC; Daniel Boudwin

(57) ABSTRACT

A multifunctional handheld applicator includes a handle having a material reservoir, an upper portion, and a lower portion. A mechanism housing is affixed to the upper portion of the handle and includes a motor operably connected to a drive gear. A pair of cam gears are mechanically engaged with and disposed on opposing sides of the drive gear. A cam is affixed to each cam gear, wherein each cam engages an opposing end of an actuator affixed to a head assembly that is operably connected to the mechanism housing. Activation of motor causes rotation of the drive gear, which causes the cams to make alternating reciprocal contact with the opposing ends of the actuator, thereby causing reciprocal side-to-side motion of the head assembly and the attached scrubbing pad. A pulley, cable, and spring assembly also causes reciprocal up-and-down motion of the head assembly via a sliding exterior handle portion.

11 Claims, 13 Drawing Sheets

(51) Int. Cl.
*A46B 13/04* (2006.01)
*A47K 7/02* (2006.01)
*A47K 7/03* (2006.01)
*A47K 7/04* (2006.01)
*A61H 7/00* (2006.01)

(52) U.S. Cl.
CPC .................. *A47K 7/03* (2013.01); *A47K 7/04* (2013.01); *A61H 7/004* (2013.01); *A46B 11/0062* (2013.01); *A46B 11/0065* (2013.01); *A46B 2200/1006* (2013.01); *A46B 2200/1046* (2013.01)

(56) References Cited

U.S. PATENT DOCUMENTS

| | | | | |
|---|---|---|---|---|
| 5,671,497 | A | 9/1997 | Abdo | |
| 6,042,286 | A | 3/2000 | Pazienza | |
| 7,063,476 | B1 | 6/2006 | Pinnix et al. | |
| 7,309,180 | B2 | 12/2007 | Russell et al. | |
| 8,646,142 | B2 | 2/2014 | Ferrara et al. | |
| 2006/0021169 | A1* | 2/2006 | Choo ..................... | A45D 33/36 15/97.1 |
| 2014/0330289 | A1* | 11/2014 | Revivo .................. | A46B 13/02 606/131 |

* cited by examiner

MULTIFUNCTIONAL HANDHELD APPLICATOR

CROSS REFERENCE TO RELATED APPLICATIONS

This application claims the benefit of U.S. Provisional Application No. 63/148,271, filed on Feb. 11, 2021. The above identified patent application is herein incorporated by reference in its entirety to provide continuity of disclosure.

BACKGROUND OF THE INVENTION

The present invention relates to a multifunctional handheld applicator. More particularly, the present invention provides a multifunctional handheld applicator that can be utilized to moisturize, scratch, apply soap, massage, and perform other functions on areas of body such as the upper back, from the waist to the shoulders.

It is difficult for many individuals to reach their back with their own hands for the purpose of cleaning, scratching, massaging, or the like. Assistance may be required to reach certain areas of a human body, which is not always available when needed. Some individuals may utilize a washcloth or other manual devices to scratch an area or apply lotion or body solutions. However, washcloths are prone to spread germs and do not provide a means for reaching the user's back and certain manual devices require immense effort to use. Additionally, multiple devices are needed to provide massage capabilities, material applicating capabilities, and other important functions. It can be difficult, time consuming, and expensive to acquire multiple single use devices. In order to address these concerns, the present invention provides an adjustable applicator that allows users to clean their back and other difficult to reach locations without assistance from another.

Devices have been disclosed in the known art that relate to handheld applicators. These include devices that have been patent and disclosed in published patent applications. However, the devices in the known art have several drawbacks. For example, the applicators in the known art that are powered typically only include one direction or mechanism of motion, whether it be reciprocal or vibratory. Further, the devices in the known art often only include a single working end attachment that cannot be changed for different attachments, limiting the utility of these devices. It is therefore desirable to provide a multifunctional handheld applicator that includes the combined features of multiple directions of oscillatory or reciprocal motion, interchangeable working end attachments, and a refillable dispensing reservoir for dispensing various materials.

In light of the devices disclosed in the known art, it is submitted that the present invention substantially diverges in functional and design elements from the known art and consequently it is clear that there is a need in the art for an improvement to multifunctional handheld applicator devices. In this regard the present invention substantially fulfills these needs.

SUMMARY OF THE INVENTION

In view of the foregoing disadvantages inherent in the types of multifunctional handheld applicators, massagers, and similar devices now present in the known art, the present invention provides a multifunctional handheld applicator that can be utilized to moisturizer, scratch, apply soap, massage, and perform other functions on areas of body such as the upper back, from the waist to the shoulders.

The multifunctional handheld applicator includes a handle and a working end that includes a head assembly with interchangeable attachments such as scrubbing pads and the like. The upper portion of the handle attaches to a mechanism housing that accommodates the various mechanical and electrical components of the invention. The handle also includes a refillable material reservoir and a powered pump capable of dispensing material from the reservoir through a tube and out of an outlet onto the item attached to the head assembly of the device. The head assembly is a securely movable unit attached to the mechanism housing, such that the head portion of the device is capable of reciprocal motion, swinging at pre-set angles, with the option to add a vertical rectilinear motion of the device via an internal spring, pulley, and sliding handle function. In addition, different pad attachments with magnetic bonds will be supplied, to perform the various functions, such as a scratching moisturizing, soap dispensing, or other types of useful applications of the device. The head assembly attachments are powered and motorized via a connection with the internal electronics of the handle end. In this way, the device can perform various important tasks.

Other objects, features, and advantages of the present invention will become apparent from the following detailed description taken in conjunction with the accompanying figures.

BRIEF DESCRIPTION OF THE FIGURES

The invention itself and manner in which it may be made and used may be better understood after a review of the following description, taken in connection with the accompanying figures wherein like numeral annotations are provided throughout. Figures that include dimensions or other measurements do so for example purposes only and are not intended to limit the scope of the present invention.

DETAILED DESCRIPTION OF THE INVENTION

Figure 1:
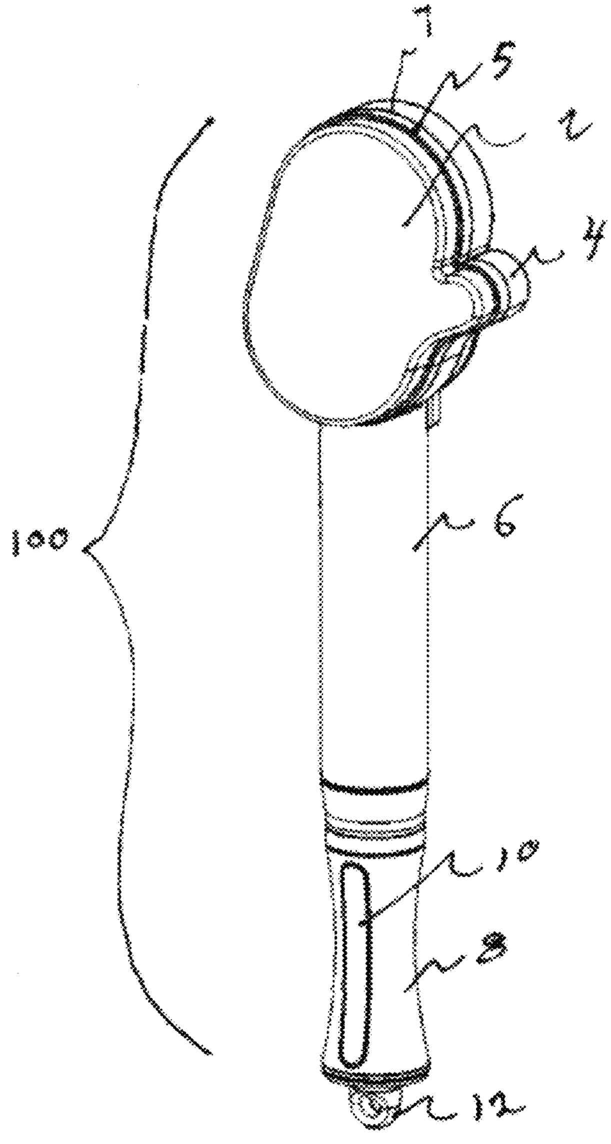
FIG. 1 shows a front perspective view of an embodiment of the multifunctional handheld applicator.

Reference is made herein to the attached figures. Like reference numerals are used throughout the drawings to depict like or similar elements of multifunctional handheld applicator. For the purposes of presenting a brief and clear description of the present invention, the preferred embodiment will be discussed as used for providing a multifunctional handheld applicator that can be utilized to scratch, massage, apply lotion to, or perform other tasks on the back or other difficult to reach areas of the body. The figures are intended for representative purposes only and should not be considered to be limiting in any respect.

Referring now to FIG. 1, there is shown a front perspective view of an embodiment of the multifunctional handheld applicator. In the shown embodiment, a scrubbing pad 2 is attached to a back plate 5 which is turn attached to the front plate 7 of a head assembly 4. The scrubbing pad 2 can be secured to the front plate 7 via clips, magnets, or other fasteners. The head assembly 4 includes the mechanical powered elements of the device. The handle includes an upper portion 6 that connects to the head assembly 4 at one end. The handle also includes a lower portion 8 which comprises a refillable reservoir. The lower portion 8 is hollow and can contain liquid soap or lotion which can be viewed through viewing window 10. The lower portion 8 can be removably secured to the upper portion 6 via a threaded connection or a similar connection mechanism. When removed, an opening of the lower portion 8 can be exposed to fill the hollow interior with liquid soap or similar materials. A bottom aperture 12 allows the entire invention 100 to be hung on a hook in a shower or other convenient location.

Figure 2:
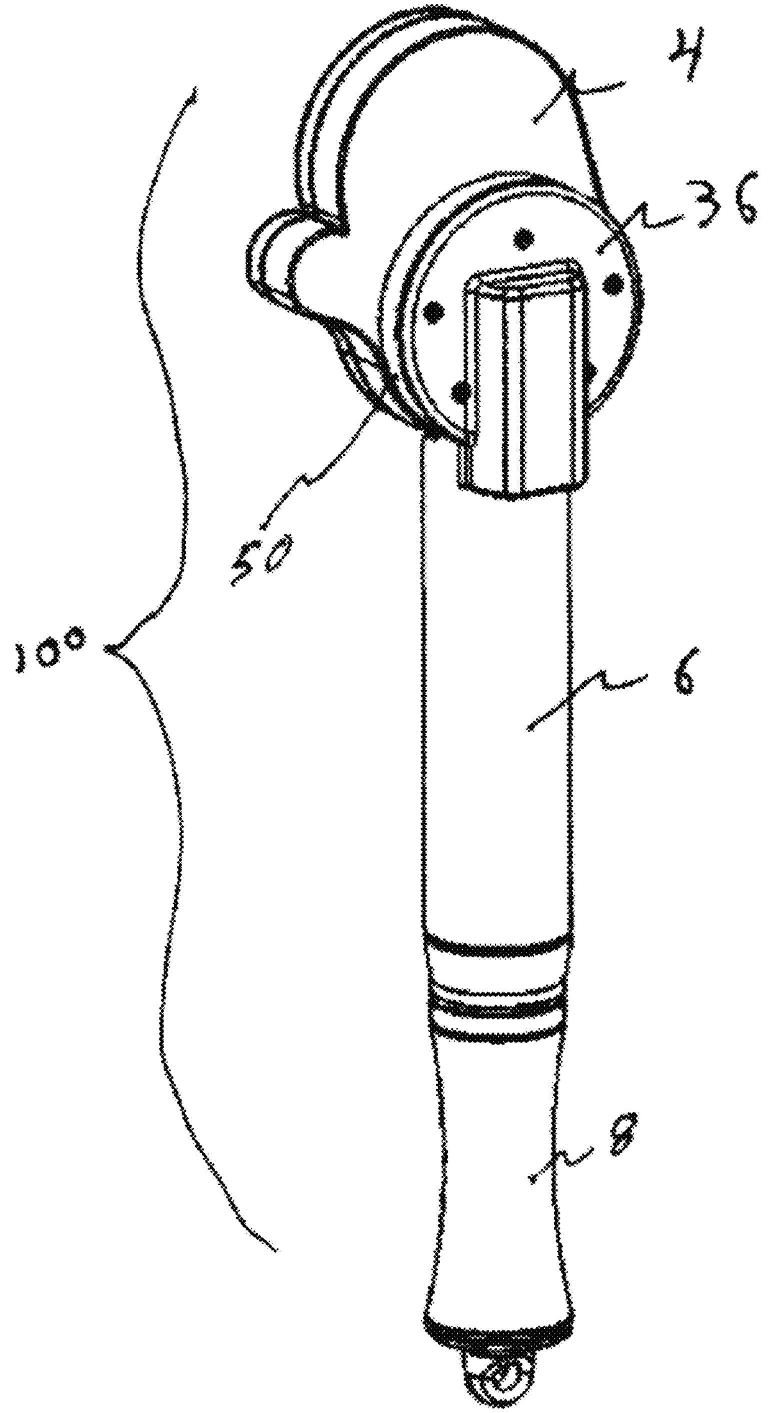
FIG. 2 shows a rear perspective view of an embodiment of the multifunctional handheld applicator.

Referring now to FIG. 2, there is shown a rear perspective view of an embodiment of the multifunctional handheld applicator. In the shown embodiment, a connecting plate 36 and stationary mechanism housing 50 are fixedly attached to the upper end of the upper portion 6. The scrubbing assembly back plate 5 is operably connected to the connecting plate 36 and is capable of rotating back and forth in relationship to stationary mechanism housing 50 as will be described below. Movement of the back plate 5 in turn causes the scrubbing pad to move as the user applies the pad to their body.

Figure 3:
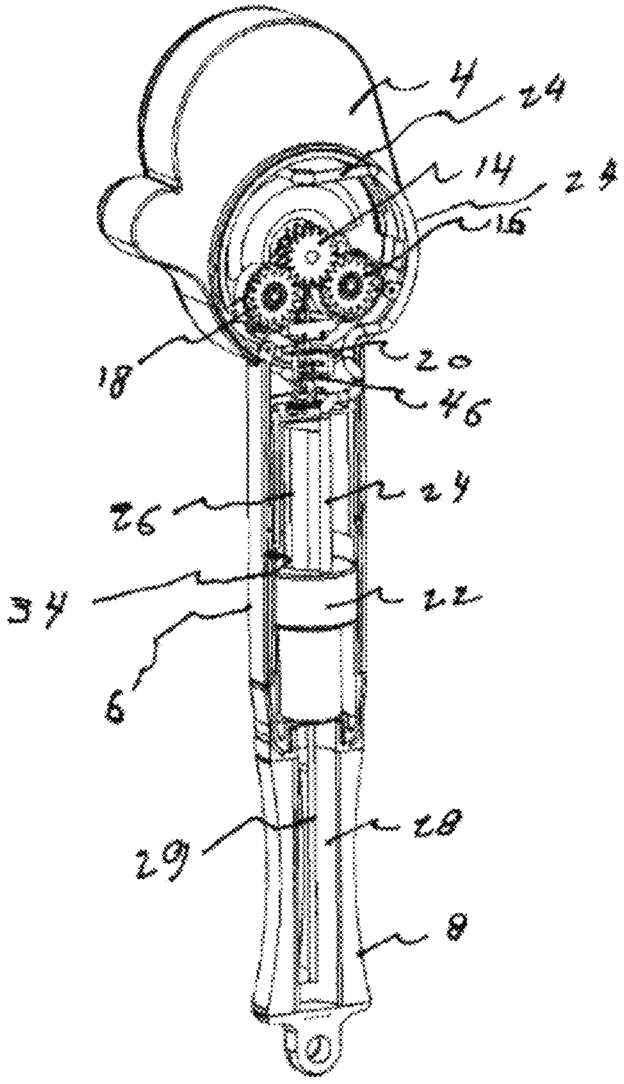
FIG. 3 shows a section view showing the rear portion of an embodiment of the multifunctional handheld applicator.
Figure 4:
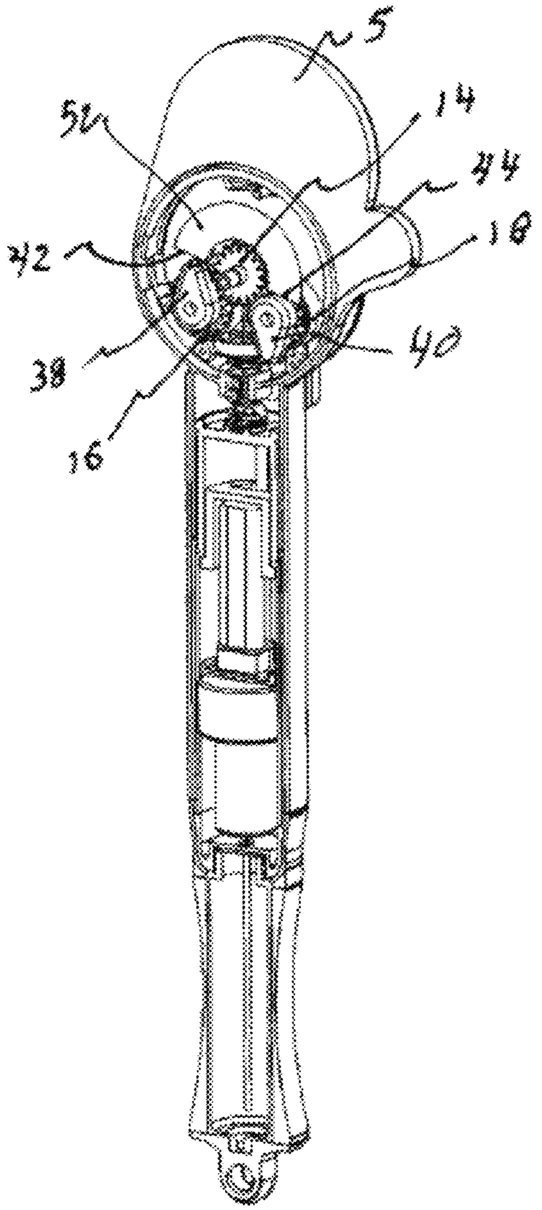
FIG. 4 shows a section view showing the front portion of an embodiment of the multifunctional handheld applicator.
Figure 7:
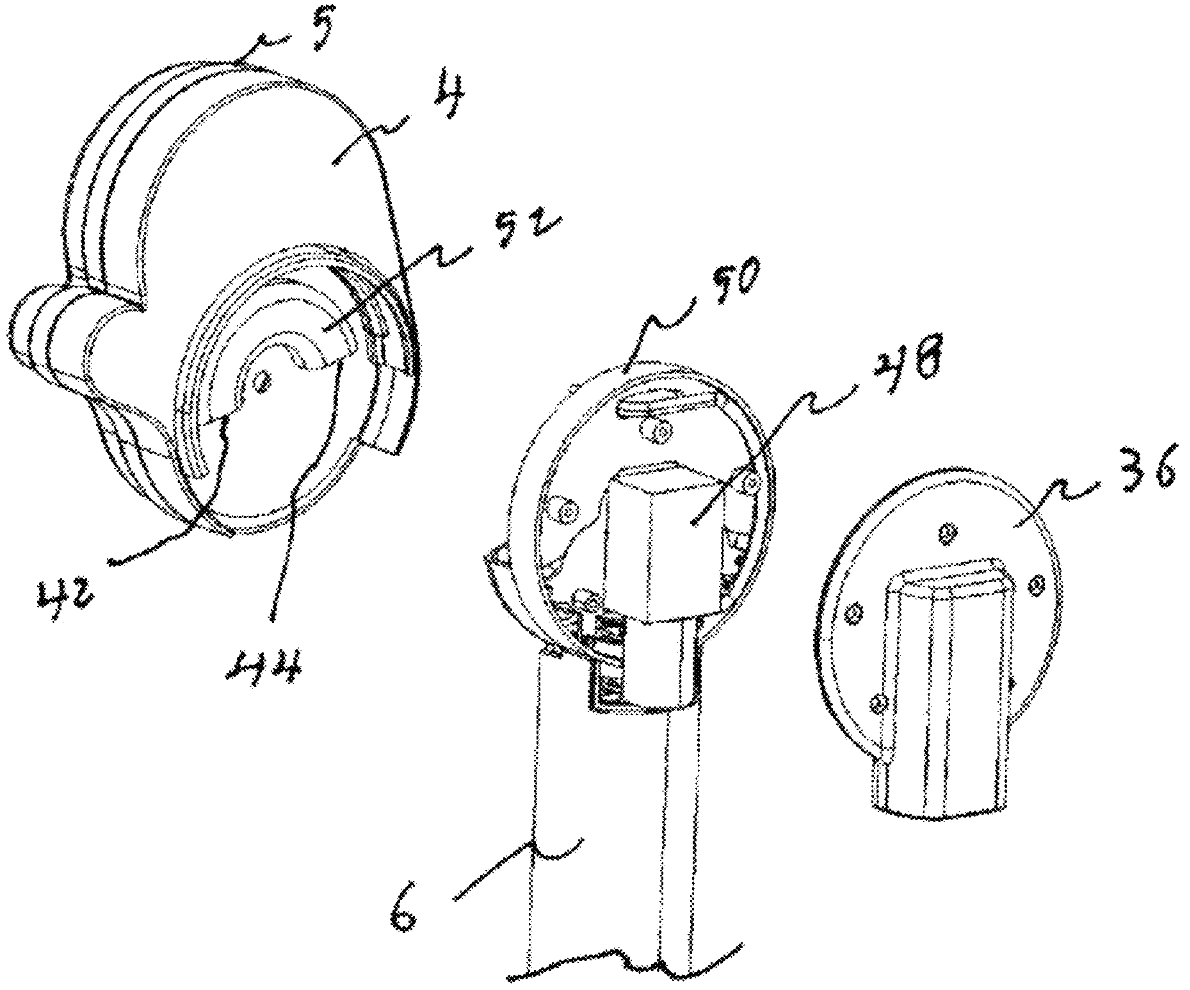
FIG. 7 shows an exploded view of the head of an embodiment of the multifunctional handheld applicator.
Figure 9:
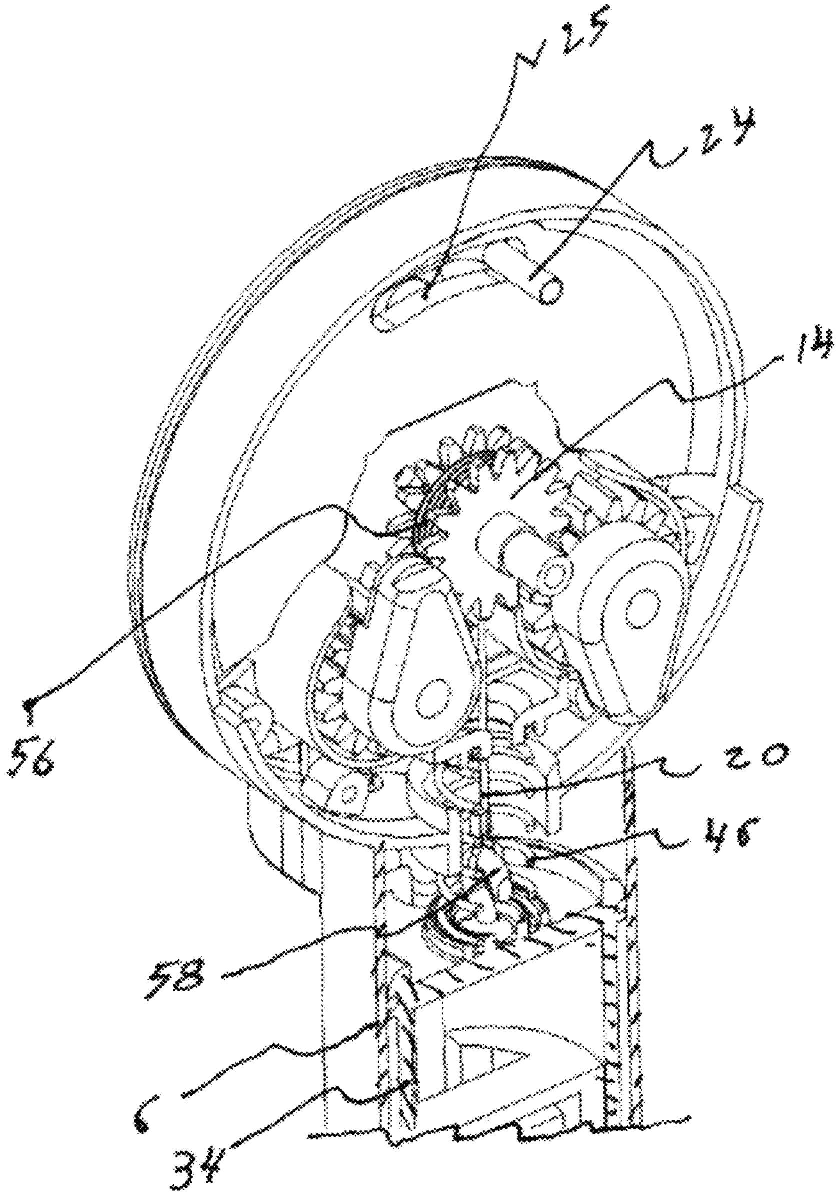
FIG. 9 shows a partial perspective section view of the head portion of an embodiment of the multifunctional handheld applicator.

Referring now to FIG. 3, there is shown a section view showing the rear portion of an embodiment of the multifunctional handheld applicator. The interior of the stationary mechanism housing 50 contains a three gear 14, 16, 18 assembly. The center gear 14 is driven by a gear motor 48 as shown in FIG. 7. Gears 16, 18 are attached to cams 38, 40, as shown in FIG. 4. A drive gear 14 causes the remaining gears 16, 18 to rotate, such that they actuate the cams 38, 40. A cable 20 is attached to a pulley 56 directly behind the drive gear 14, as shown in FIG. 9.

When the drive gear 14 turns one hundred and eighty degrees, it causes the cams 38, 40 to rotate or rock the head assembly 4 from side to side, and further causes the cable 20 to be wrapped around the pulley 56. These two movements cause the head assembly 4 to undergo a simultaneous rocking action as well as an up and down action. A compression spring 46 is operably connected to the cable 20. The compression spring 46 forces the head assembly 4 to return to its extended position after being pulled down by cable 20, helping to achieve the oscillating motion. The lower portion 8 includes an interior reservoir 28 which can hold soap, lotion, or other material for application to the user's body. A peristaltic pump 22 sucks the material up via tube 29 from the reservoir 28 and pumps it via a flexible tube 24 that extends through the handle to the rear of the scrubbing pad where it can be combined with shower water to apply soap to a person's back. The upper end of the flexible tube 24 may include an opening that contacts the rear of the scrubbing pad in order to dispense the material thereto. Additionally, the reservoir 28 can be filled with various types of lotions, such as suntan lotion, so that the lotion may be applied evenly over a person's back while he or she holds the lower portion 8 and extends the invention 100 over his or her shoulder to reach his or her back torso. Obviously, the user can apply lotion or soap to other portions of the body such as legs, or front torso.

Referring now to FIG. 4, there is shown a section view showing the front portion of an embodiment of the multifunctional handheld applicator. This rear section view shows the cams 38, 40 resting on the lower portions 42, 44 of a semi-circular actuator 52. A first cam 38 is fixedly attached to a first cam gear 16 and a second cam 40 is fixedly attached to a second cam gear 18. The drive gear 14 engages both cam gears 16, 18, such that the cam gears 16, 18 rotate upon rotation of the drive gear 14. The cams 38, 40 are oriented such that, as the cam gears 16, 18, rotate, the cams 38, 40 make repeated alternating contact with the ends of the semi-circular actuator 52. This causes the rocking motion of the semi-circular actuator 52, which is imparted to a scrubbing head or other device attached to the back plate 5 of the head assembly.

Figure 5:
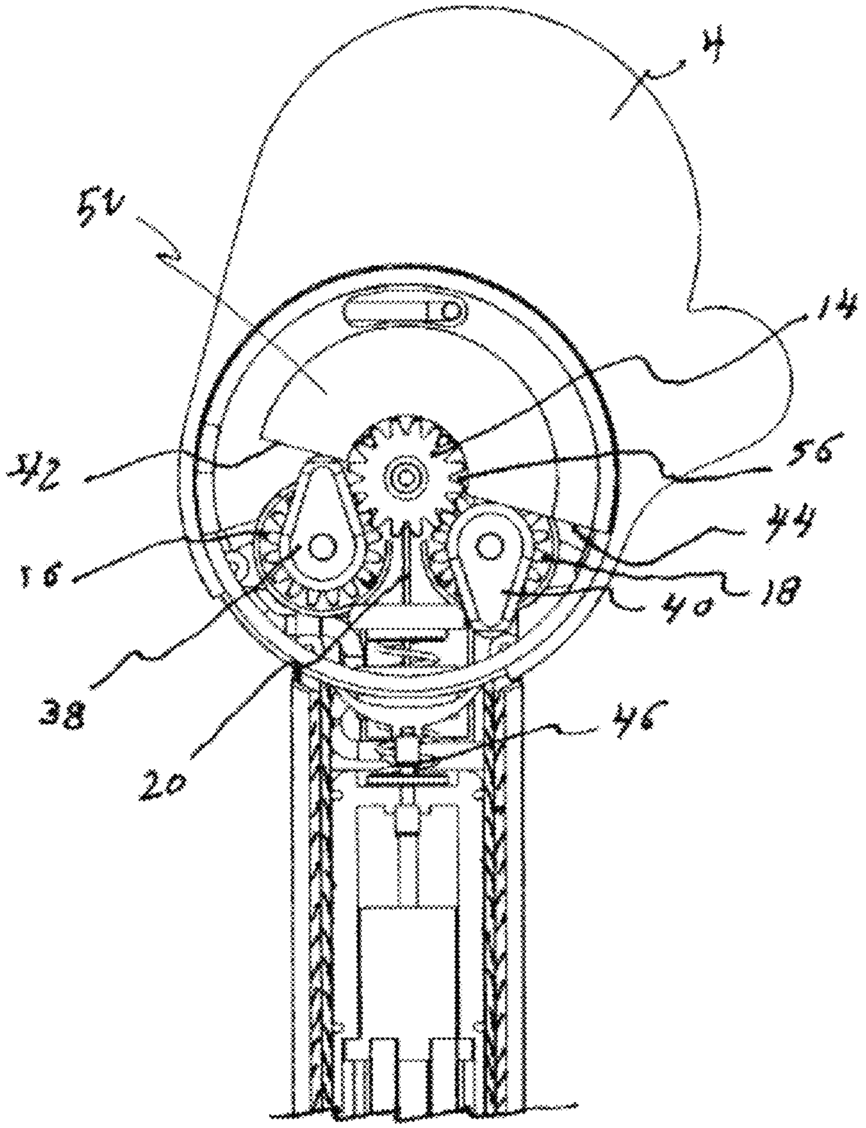
FIG. 5 shows a partial section view of an embodiment of the multifunctional handheld applicator showing the cam swing mechanism and cable draw linear mechanism rocked to the right.

Referring now to FIG. 5, there is shown a partial section view of an embodiment of the multifunctional handheld applicator showing the cam gear swing mechanism and cable draw linear mechanism rocked to the right. One cam 38 is rotated to the high position forcing the one lower portion 42 of the semi-circular actuator 52 upwardly, while allowing the cam gear 16 to rotate against the lower portion 42. The other cam 40 is rotated to the low position allowing the second cam 18 to contact the opposing lower portion 44 of the semi-circular actuator 52 and rock down as shown. Further, the rotation of the drive gear 14 causes linear reciprocal movement of the cable 20, which is biased in one direction due to the compression spring 46. In this way, the head assembly 4 is able to have reciprocal motion in multiple directions, both side to side and up and down.

Figure 6:
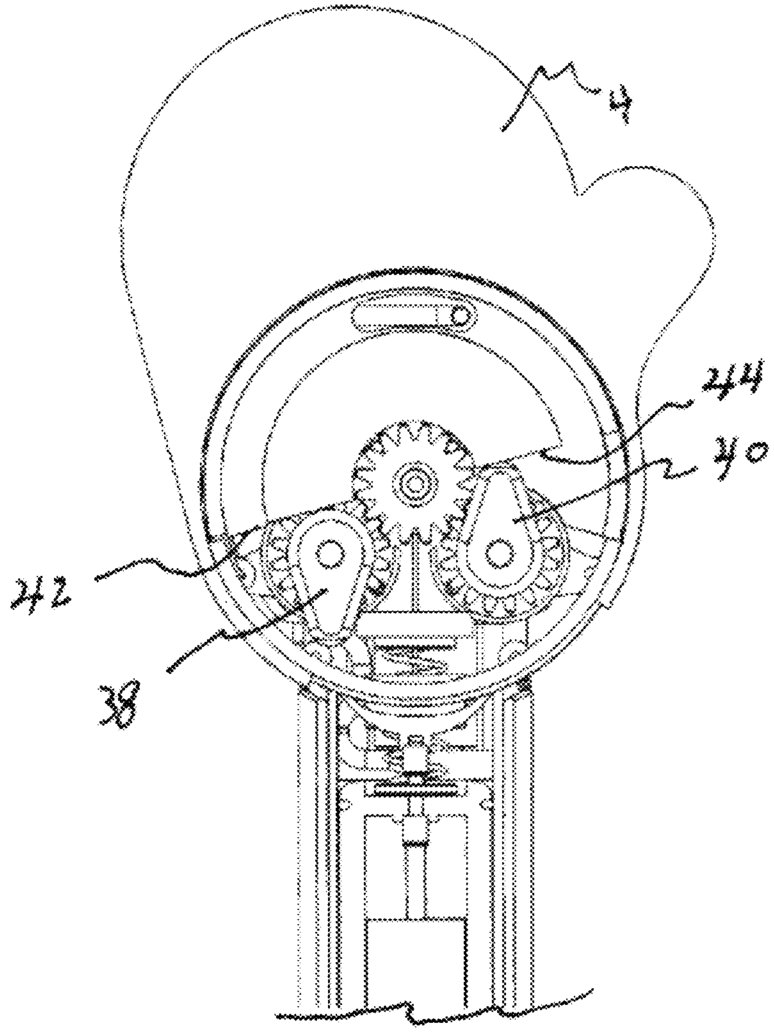
FIG. 6 shows a partial section view of an embodiment of the multifunctional handheld applicator showing the cam gear swing mechanism rocked to the left.

Referring now to FIG. 6, there is shown a partial section view of an embodiment of the multifunctional handheld applicator showing the cam gear swing mechanism rocked to the left. As cams 38, 40 rotate one hundred and eighty degrees From their starting point shown in FIG. 5, they are rocked to the left as shown. This causes the scrubbing head assembly 4 to move to the opposing side, as the lower ends 42, 44 of the semi-circular actuators 52 are contacted.

Referring now to FIG. 7, there is shown an exploded view of the head of an embodiment of the multifunctional handheld applicator. In the shown embodiment, the connecting plate 36 is shown as removed from a stationary mechanism housing 50 revealing a gear motor 48 whose shaft is operably connected to the drive gear 14. The semi-circular actuator 52 is shown affixed to a rear side of the head assembly 4. The lower ends 42, 44 of the semi-circular actuators 52 are the surfaces that cams 38, 40 interact with.

Figure 8:
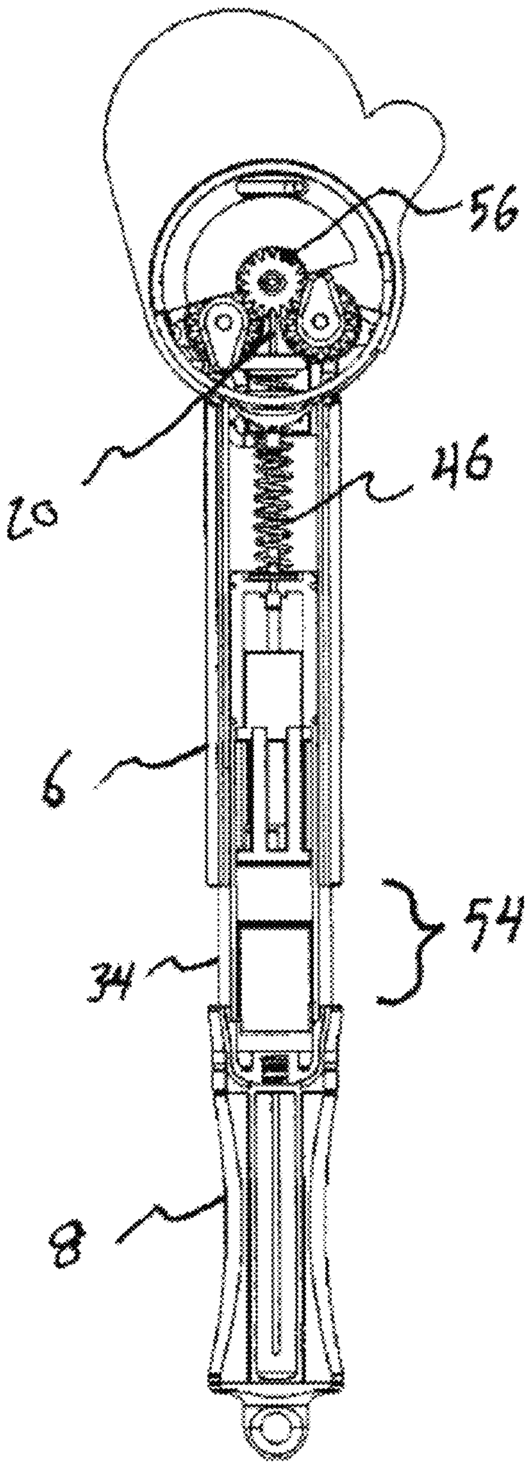
FIG. 8 shows an elongate full section view of an embodiment of the multifunctional handheld applicator in the extended position.

Referring now to FIG. 8, there is shown an elongate section view of an embodiment of the multifunctional handheld applicator in the extended position. This view shows the upper portion 6 and lower portion 8 extended position 54. The difference between the extended position 54 and the retracted position as shown in FIG. 1 show an up and down motion of the upper portion 6 so that when the user presses a start button to energize gear motor 48, both a side-to-side rocking motion and an up and down motion are subjected to head assembly 4.

Referring now to FIG. 9, there is shown a partial perspective section view of the head portion of an embodiment of the multifunctional handheld applicator. In the shown embodiment, the cable 20 is attached to a hook 58 which is in turn attached to a stationary inner handle portion 34. The upper portion 6 of the handle 6 slides up and down on stationary inner handle portion 34 as it also moves side-to-side due to the cams. The pulley 56 is attached to the gear motor 48 shaft adjacent the drive gear 14. The pulley 56 retains the cable 20, such that the cable 20 wraps around the pulley 56 when the shaft turns clockwise and unwraps cable 20 when the shaft turns counter-clockwise. This view also shows the flexible tube 24 of the tubing that connects to the handle reservoir. The flexible tube 24 extends through a slot 25 in the head assembly which allows the tubing to not be impinged upon during the rocking motion.

Figure 10:
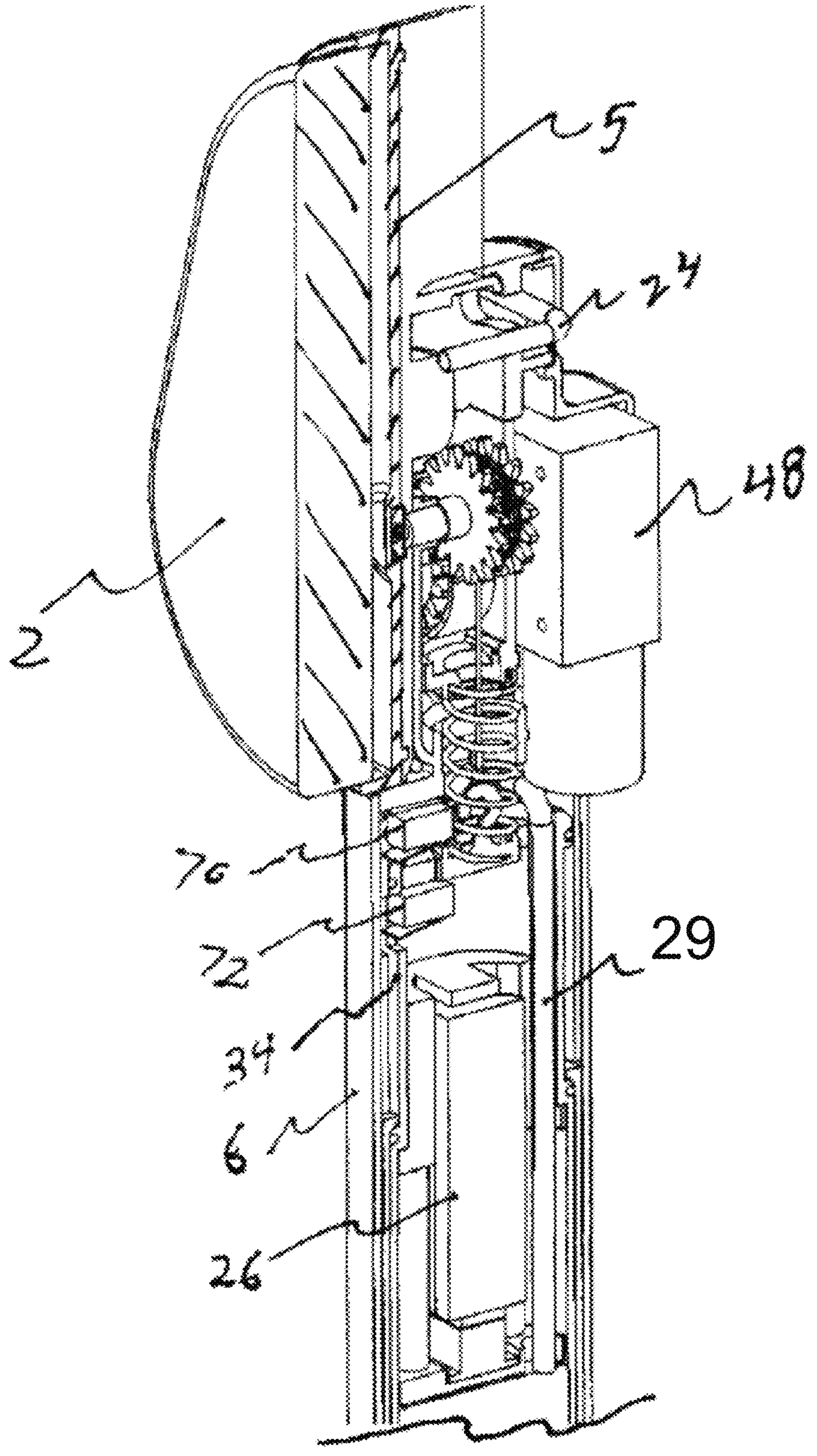
FIG. 10 shows a side section view of the motor drive portion and the mechanism of an embodiment of the multifunctional handheld applicator.
Figure 11:
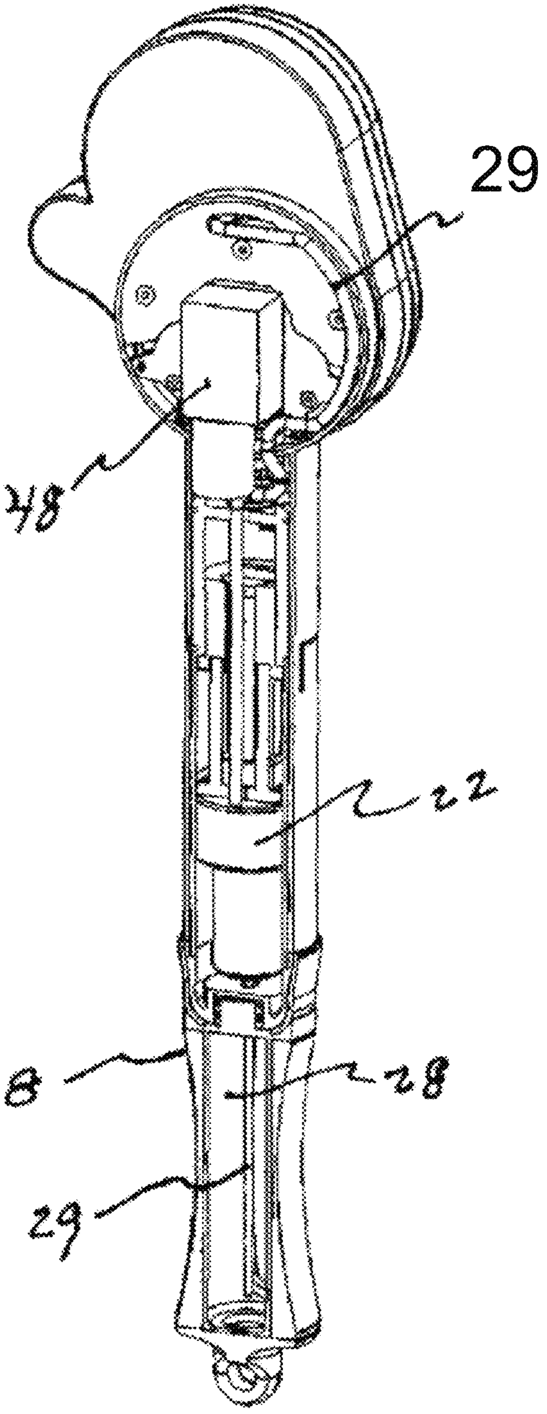
FIG. 11 shows a full section view of an embodiment of the multifunctional handheld applicator in the compressed condition.

Referring now to FIGS. 10 and 11, there is shown a side section view of the motor drive portion of an embodiment of the multifunctional handheld applicator and an elongate section view of an embodiment of the multifunctional handheld applicator in the compressed condition, respectively. In the shown embodiment, the device includes micro switches 70, 72 which sense the upper most travel and lower most travel of upper portion 6 in relation to stationary inner handle 34. A battery 26 is clearly seen which powers both the gear motor 48 and the peristaltic pump 22. The pump 22 is configured to dispense material from the handle reservoir when activated. The pump 22 can be activated via one or more external controls disposed on the handle.

Figure 12:
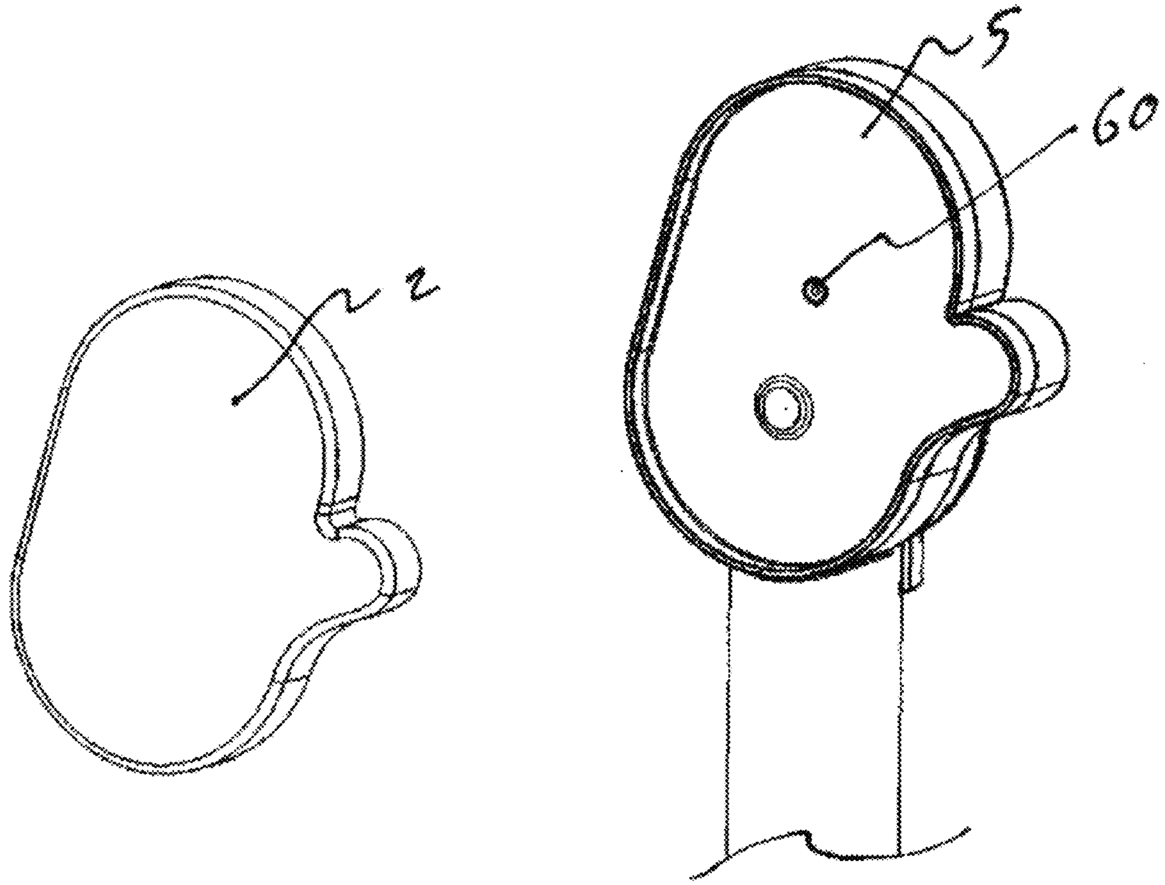
FIG. 12 shows an exploded view of an embodiment of the multifunctional handheld applicator showing the method by which the various pads are attached to the pad backplate.

Referring now to FIG. 12, there is shown an exploded view of an embodiment of the multifunctional handheld applicator showing the scrubbing pad removed from the pad backplate. In operation, an aperture 60 on the back plate 5 is where the soap or lotion exits the tubing flexible, so that it may then enter the rear side of scrubbing pad 2. The scrubbing pad 2 can have any variety of shape and materials, such that different scrubbing pads 2 may be attached for different uses as desired. In the shown embodiment, the scrubbing pad 2 and its back plate 5 are symmetrical. The scrubbing pad 2 can be removably secured to the back plate 5 via frictional fit or via fasteners such as magnets, clips, or any other suitable mechanism.

Figure 13:
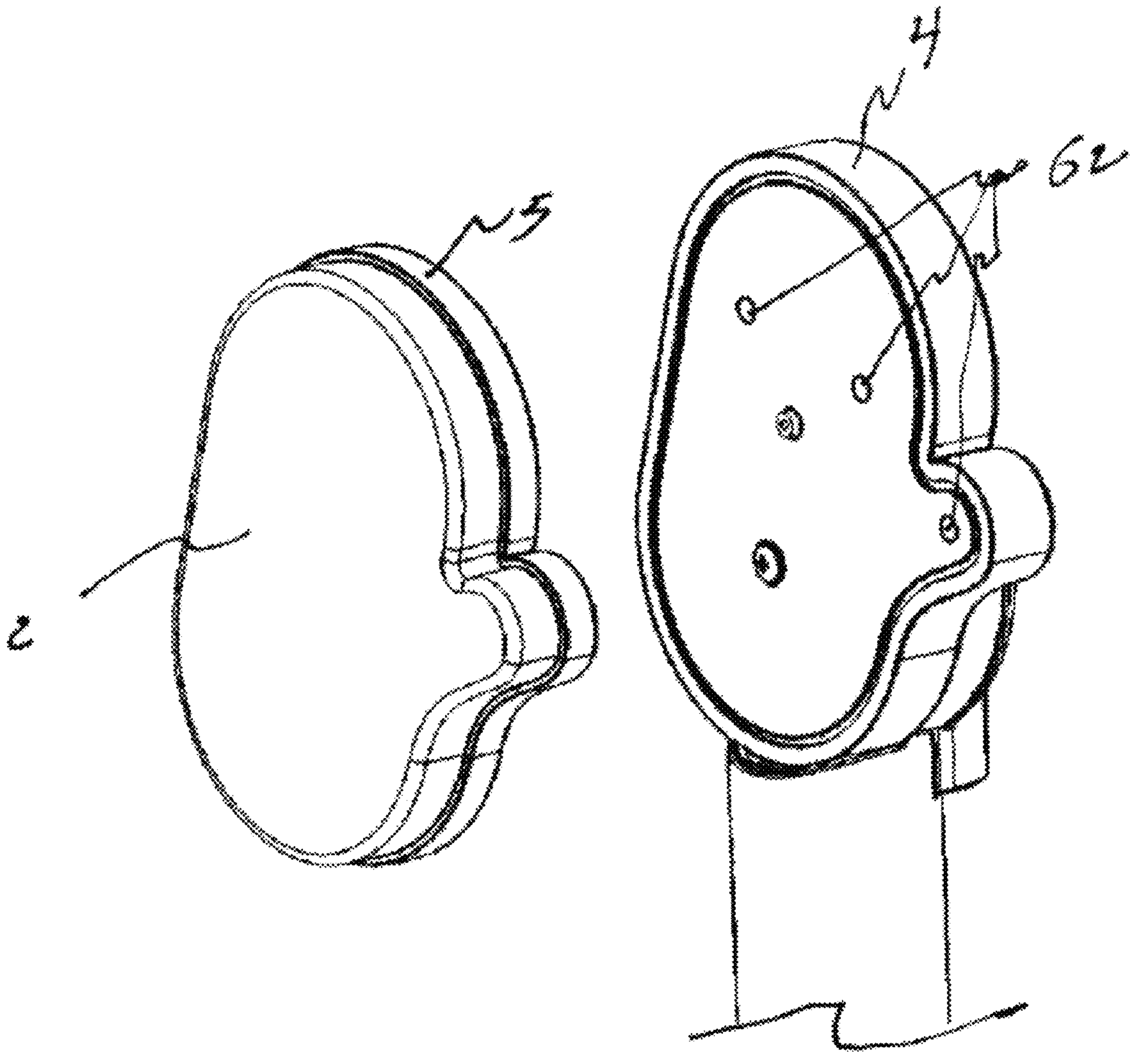
FIG. 13 shows an exploded view of an embodiment of the multifunctional handheld applicator showing the magnetic attachment of the pad backplate and the front plate of one of the pad heads.

Referring now to FIG. 13, there is shown an exploded view of an embodiment of the multifunctional handheld applicator showing the magnetic attachment of the pad backplate and the front plate of the scrubbing head. Magnets 62 on the front face of head assembly 4 are attracted to mating magnets located on the rear of back plate 5. The magnets allow the scrubbing pad 2 to be easily secured to the head assembly 4 and removed as needed, when an individual wishes to change to a scrubbing pad 2.

In some embodiments, the device includes different working end attachments that are interchangeable. The working end attachments perform various functions for the user. For example, one such attachment may include a brush or similar device having bristles or other elements for scratching or scrubbing the back or other difficult to reach areas of the body. In another embodiment, the working end attachment can include a soap dispensing sponge with an actuator that is in operable communication with the control electronics in the handle end. The handle end can additionally include various controls for controlling the function of the working end attachments. In other embodiments, the working end attachments include a vibrating massager. The vibrating massager can be operably connected to a vibration motor disposed within the handle end, such that actuation of the motor via the handle controls the operation of the attached massager. In this way, the user can select a working end attachment for a desired function, while utilizing the adjustable handle end to easily reach the back or other difficult to access areas of the body.

It is therefore submitted that the present invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, and all equivalent relationships to those illustrated in the drawings and described in the specification are intended to be encompassed by the present invention.

The foregoing is considered as illustrative only of the principles of the invention. Further, it is not desired to limit the invention to the exact construction and operation shown and described, and accordingly, all suitable modifications and equivalents may be resorted to, falling within the scope of the invention.

I claim:

1. A multifunctional handheld applicator, comprising:

a handle having an upper portion and a lower portion;

a mechanism housing affixed to the upper portion of the handle, the mechanism housing includes a motor operably connected to a drive gear;

a pair of cam gears mechanically engaged with and disposed on opposing sides of the drive gear;

a cam affixed to each cam gear;

wherein each cam engages an opposing end of an actuator affixed to a head assembly that is operably connected to the mechanism housing;

a scrubbing pad removably connected to the head assembly;

wherein activation of the motor causes rotation of the drive gear, which causes rotation of the cam gears, which causes the cams to make alternating reciprocal contact with the opposing ends of the actuator, thereby causing reciprocal motion of the head assembly and the attached scrubbing pad; and further comprising a material reservoir disposed within the lower portion of the handle, wherein a tube connects to a pump configured to pump material from the reservoir, through the tube, and out of a dispensing outlet of the attached scrubbing pad when activated.

2. The multifunctional handheld applicator of claim 1, wherein the scrubbing pad is removably secured to a back plate.

3. The multifunctional handheld applicator of claim 1, wherein the head assembly is removably secured to the mechanism housing.

4. The multifunctional handheld applicator of claim 3, wherein the head assembly includes a back plate having plurality of magnets configured to removably secure to a plurality of mating magnets disposed on a connecting plate of the mechanism housing.

5. The multifunctional handheld applicator of claim 1, further comprising:

a pulley operably connected to the motor;

a cable connected to the pulley at one end and to a sliding outer portion of the upper handle portion;

wherein the sliding outer portion slidably engages a stationary inner handle portion, such that the outer portion of the handle slides in a first direction when the motor rotates clockwise and an opposing second direction when the motor rotates counterclockwise.

6. The multifunctional handheld applicator of claim 5, further comprising a spring wrapped around the cable and disposed between the stationary inner portion and the mechanism housing.

7. The multifunctional handheld applicator of claim 1, further comprising an aperture connected to the lower portion of the handle.

8. The multifunctional handheld applicator of claim 1, further comprising a battery disposed within the handle configured to power the motor and the pump.

9. The multifunctional handheld applicator of claim 1, further comprising a slot disposed in the head assembly through which the tube extends.

10. The multifunctional handheld applicator of claim 1, wherein the actuator of the head assembly comprises a semi-circular ring having a first end abutting the first cam and a second end abutting the second cam.

11. The multifunctional handheld applicator of claim 1, wherein a perimeter edge of the scrubbing pad aligns with a perimeter edge of the head assembly when secured thereto.

* * * * *